United States Patent [19]

Steinberg et al.

[11] Patent Number: 5,466,362

[45] Date of Patent: Nov. 14, 1995

[54] PROCESS AND SYSTEM FOR CATALYST ADDITION TO AN EBULLATED BED REACTOR

[75] Inventors: Robert M. Steinberg; John C. Strickland, both of Houston, Tex.

[73] Assignee: Texaco Inc., White Plains, N.Y.

[21] Appl. No.: 978,614

[22] Filed: Nov. 19, 1992

[51] Int. Cl.[6] .................................................. C10G 35/00
[52] U.S. Cl. ........................ 208/157; 208/152; 208/153; 208/158
[58] Field of Search .................................... 208/152, 143, 208/157, 153, 158

[56] References Cited

U.S. PATENT DOCUMENTS 3,183,180  2/1964  Schuman et al. ....................... 208/143
5,021,147  6/1991  Van Driesen et al. .................. 208/152

Primary Examiner—Asok Pal
Assistant Examiner—Bekir L. Yildirim
Attorney, Agent, or Firm—James L. Bailey; Kenneth R. Priem; Richard A. Morgan

[57] ABSTRACT

In an ebullated bed process for hydrotreating a distillate hydrocarbon feedstock it has been found that a catalyst addition slurry is made up with catalyst and feedstock. A control system provides for a constant distillate feedstock rate during intermittent catalyst addition.

7 Claims, 1 Drawing Sheet

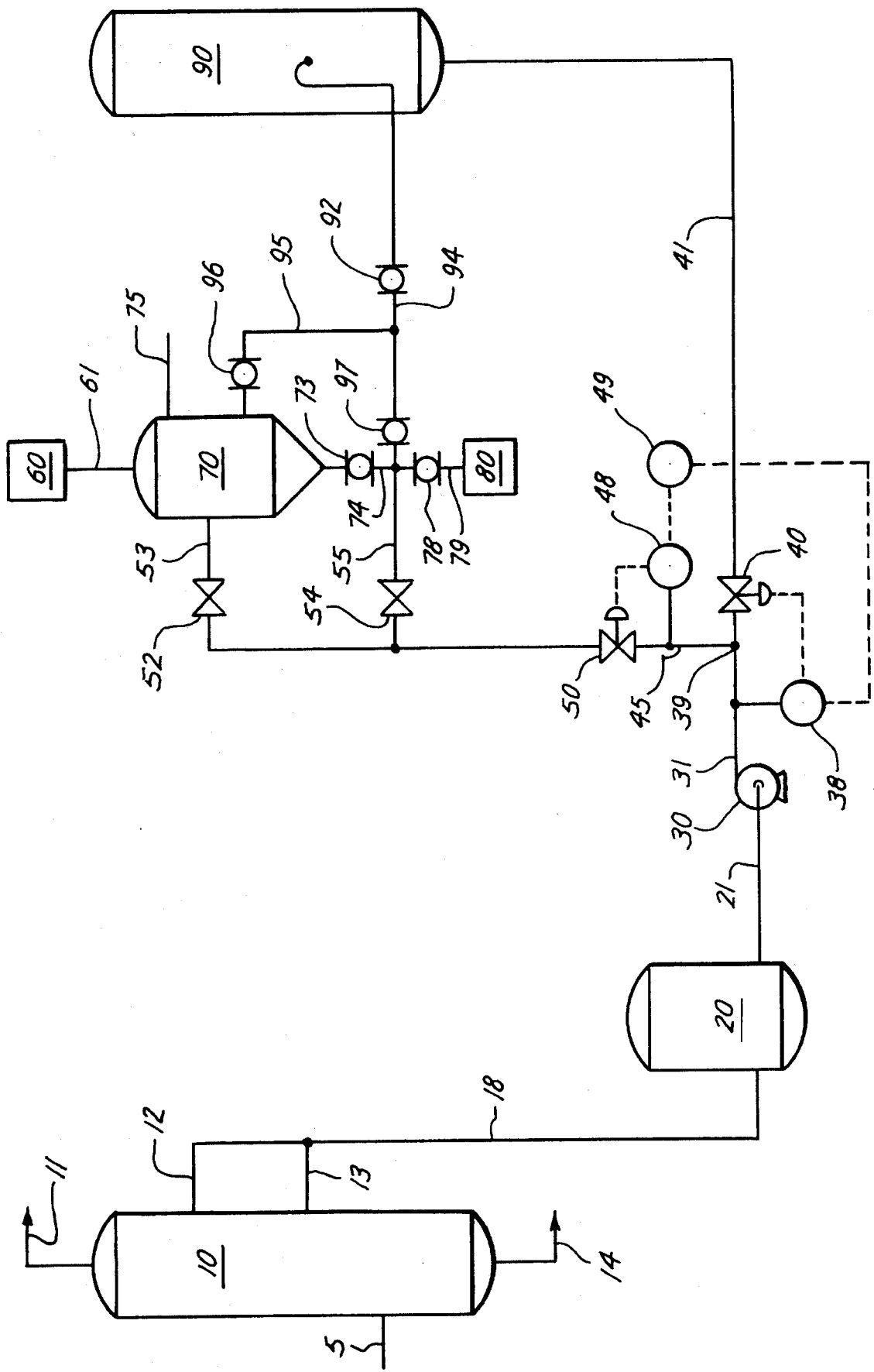

PROCESS AND SYSTEM FOR CATALYST ADDITION TO AN EBULLATED BED REACTOR

BACKGROUND OF THE INVENTION

1. Field of the Invention

The invention relates to a process for adding feedstock and catalyst to a high pressure reaction vessel, such as that employed in an ebullated bed process for hydrotreating petroleum derived hydrocarbon distillate fractions. The invention also relates to a control system for adding a catalyst slurry to an ebullated bed reaction vessel.

2. Description of Other Related Methods In The Field

The ebullated bed process comprises the passing of concurrently flowing streams of liquids or slurries of liquids and solids and gas upwardly through a vertically elongated cylindrical vessel containing a catalyst bed. The catalyst in the bed is maintained in random motion in the liquid and has a gross volume dispersed through the liquid greater than the volume of the catalyst when stationary. This technology has been used commercially in the upgrading of heavy liquid hydrocarbons or converting coal to synthetic oils.

The process is generally described in U.S. Pat. No. Re. 25,770 to Johanson incorporated herein by reference. A mixture of hydrocarbon liquid and hydrogen is passed upwardly through a bed of catalyst particles at a rate such that the particles are forced into random motion as the liquid and gas flow upwardly through the bed. The random catalyst motion is controlled by recycle liquid flow so that at steady state, the bulk of the catalyst does not rise above a definable level in the reactor. Vapors along with the liquid which is being hydrogenated are removed at the upper portion of the reactor.

The ebullated bed process has been found to be applicable to hydrocracking petroleum derived hydrocarbon distillate fractions. U.S. Pat. No. 5,108,580 to G. Nongbri et al. teaches the ebullated bed hydrocracking of a heavy vacuum gas oil fraction. This distillate fraction is recycled to extinction between an ebullated bed hydrocracker and a fluid catalytic cracker (FCC).

U.S. Pat. No. 4,744,877 to R. P. Van Driesen et al. teaches a process for adding and withdrawing catalyst from a high pressure reactor which is particularly suited to an ebullated bed reactor. Fresh catalyst is mixed with a transport oil such as light gas oil to form a slurry. The slurry is pumped into the reactor at a predetermined flow rate under flow control (col. 4, lines 17–18).

U.S. Pat. No. 3,398,085 to T. M. Engle teaches a method of adding catalyst to an ebullated bed reactor. Catalyst inventory is controlled either continuously or intermittently.

Related improvements in the art include U.S. Pat. No. 3,523,888 to N. C. Stewart et al.; U.S. Pat. No. 3,410,792 to R. P. Van Driesen et al.; U.S. Pat. No. 3,410,791 to L. A. Perry et al.; and U.S. Pat. No. 3,336,217 to E. P. Meaux.

The related art teaches the adding of catalyst to an ebullated bed reactor in a residuum hydrocracking process with the aid of a discrete slurry oil. There is a need in the art for a method of adding catalyst to an ebullated reactor in a distillate hydrocarbon hydrotreating process.

SUMMARY OF THE INVENTION

A distillate hydrocarbon feedstock is continuously hydrotreated in an ebullated bed of particulate catalyst. In the process the flow rate (F1) of the total feedstock flowing to the ebullated bed is set at a desired rate. A minor portion of the total feedstock is withdrawn at a minor portion rate (F2). A measured amount of addition catalyst is added to the minor portion of feedstock at a rate (F3) to form an addition catalyst slurry. The addition catalyst slurry is added to the ebullated bed at a flow rate (F2+F3). As a result, a constant flow rate (F1) of feedstock to the ebullated bed is maintained during catalyst addition.

BRIEF DESCRIPTION OF THE DRAWING

In the drawing is a diagrammatic representation of the process.

DETAILED DESCRIPTION OF THE INVENTION

Feedstocks for the process are derived from crude petroleum. The source of the crude petroleum is not critical; however, Arabian Light and West Texas intermediate are preferred feedstocks in the petroleum refining industry because these petroleums are rather light and have a relatively low viscosity compared with other whole crude petroleums. The viscosity of Arabian Light petroleum is about 1.0 cp at 280° F. (137° C.) with a gravity of about 34.5° API. Other whole crude petroleum having a gravity of between about 33° API and 36° API are preferred and are considered premium grade because of their low gravity. In general crude petroleum having a gravity of 30° API and lighter are desirable. Crude petroleum having a gravity of 20° API and heavier are less desirable though they may be used as feedstocks to produce intermediate distillates for the process.

Crude petroleum is subjected to fractional distillation in fractional distillation towers including a pipe still and a vacuum pipe still with lesser associated distillation towers. The resulting fractions range from the lightest hydrocarbon vapors to the heaviest vacuum residuum fraction having an initial boiling point of about 950° F. (510° C.). Intermediate between propane and propylene and the heavy vacuum residuum fraction are a number of intermediate fractions which are referred to in the art as distillate fractions. The boiling ranges of each of these distillate fractions is determined by refinery configuration and product demand. These distillate fractions typically include gasoline, naphtha, kerosene, diesel oil, gas oil and vacuum gas oil.

With reference to the drawing, a crude petroleum is passed via line 5 to crude petroleum fractionation zone 10 and subjected to atmospheric and vacuum distillation to produce light, hydrocarbon vapors withdrawn via line 11, light distillates withdrawn via line 12, heavy distillates withdrawn via line 13 and a vacuum residuum bottoms fraction withdrawn via line 14.

The light hydrocarbon vapors include methane, ethane, ethylene, propane and propylene. Light distillates include gasoline, naphtha, kerosene and diesel oil. Heavy distillates include gas oil and vacuum gas oil.

Typically, gasoline has a boiling range of about $C_4$ 30° F. (−1.1° C.) to 360° F. (182° C.). Naphtha has a boiling range of 90° F. (32.2° C.) to 430° F. (221° C.). Kerosene has a boiling range of 360° F. (182° C.) to 530° F. (276° C.). Diesel has a boiling range of 360° F. (182° C.) to about 650° F. to 680° F. (343° C. to 360° C.). The end point for diesel is 650° F. (343° C.) in the United States and 680° F. (360° C.) in Europe. Gas oil has an initial boiling point of about 650° F. to 680° F. (343° C. to 360° C.) and end point of about 800° F. (426° C.). The end point for gas oil is selected in view of process economics and product demand and is generally in the 750° F. (398° C.) to 800° F. (426° C.) range with 750° F. (398° C.) to 775° F. (412° C.) being most typical. Vacuum gas oil has an initial boiling point of 750° F. (398° C.) to 800° F. (426° C.) and an end point of 950° F. (510° C.) to 1100° F. (593° C.). The end point is defined by the hydrocarbon component distribution in the fraction as determined by an ASTM D-86 or ASTM D-1160 distillation. The gasoline, naphtha, kerosene and diesel portion is used for liquid fuels. The gas oil and vacuum gas oil portion is subjected to fluid catalytic cracking (FCC) or other refining process to upgrade its value or is blended with lighter fractions for use as liquid fuel.

The boiling ranges of distillate hydrocarbon fractions is subject to change. For example, the initial boiling point and boiling range distribution of gasoline is subject to federal regulation. Also, the end point of vacuum gas oil is influenced by the component distribution in the crude petroleum from which it is derived. The initial boiling point and end point of distillate fractions is not critical to the invention. The invention is applicable to distillate hydrocarbon fractions which are vaporized when subjected to vacuum distillation in a pipe still and are then recovered as overhead or sidestream fractions as liquids when reduced to atmospheric temperature and pressure.

Specifically excluded from the invention are hydrocarbon fractions referred to as residuum. Residuum includes petroleum atmospheric distillation bottoms, vacuum distillation bottoms, deasphalter bottoms, shale oil residues, tar sand extracts, bitumen, hydrocarbon residues, and mixtures comprising these residua all represented in the drawing as the vacuum residuum bottoms fraction withdrawn from petroleum fractions from petroleum fractionation zone 10 via line 14.

It is typical that the distillate hydrocarbon fractions are passed first, individually or in partially separated mixture to intermediate tankage shown collectively in the drawing as tank 20. For example gasoline, naphtha, kerosene and diesel oil may be accumulated individually in separate tanks. A heavy distillate mixture of gas oil and vacuum gas oil may be accumulated in a single tank.

These distillate hydrocarbon fractions are hydrotreated in an ebullated bed reactor to reduce the sulfur, nitrogen, metals content and unsaturation of these fractions. Catalytic hydrotreating conditions include a temperature of 650° F. (343° C.) to 950° F. (510° C.), hydrogen partial pressure of 600 psia to 3000 psia (41 atm to 204 atm) and liquid hourly space velocity (LHSV) in the range of 0.20 to 5.0 volume feedstock/hour/volume reactor.

Feedstock addition pump 30 withdraws distillate hydrocarbon feedstock from tank 20 via line 21 and delivers it via feedstock transport line 31 and line 41 to reactor vessel 90. Feedstock addition pump 30 must increase the pressure of the feedstock sufficiently to overcome the line resistance in lines 31 and 41 and the pressure in reactor vessel 90. The pressure in reactor vessel 90 is generally in the range of 800 psia to 4000 psia (54 atm to 272 atm), for example 1210 psia (82 atm). The pump discharge pressure is typically 20 psi (1.4 atm) to 100 psi (6.8 atm) above the reactor pressure, e.g. 1260 psia (85.7 atm).

The flow rate of feedstock in line 31 is regulated by feedstock addition control valve 40. Control valve 40 is responsive to a signal provided by feedstock rate sensor and controller 38 which senses the flow rate F1 in line 31. Sensor and controller 38 may be a flow rate sensor and controller in which case it will comprise a precise sharp edge restrictive orifice. Control of the flow rate in line 31 is regulated by feedstock addition control valve 40 which is downstream of feedstock rate sensor and controller 38.

At point 39, intermediate between feedstock addition control valve 40 and feedstock rate sensor and controller 38, slurry makeup line 45 joins feedstock transport line 31. A minor portion of feedstock is withdrawn from feedstock transport line 31 via slurry makeup line 45. The flow rate F2 of the minor portion of feedstock in line 45 is regulated by flow control valve 50 which is adjusted in response to a signal from flow rate sensor and controller 48. Flow rate sensor and controller 48 indicates a flow rate F2 in line 45. The ratio of flow rate (F1):flow rate (F2) generally ranges from 100:1 to 5:1, preferably 50:1 to 10:1, typically 30:1. If desired, this ratio is maintained by ratio controller 49.

It is apparent from the drawing that the arrangement of slurry makeup line 45 in withdrawing feedstock from feedstock transport line 31 intermediate between feedstock rate sensor and controller 38 and control valve 40 provides two advantages. First, the minor portion of feedstock in slurry makeup line 45 receives the full discharge pressure of feedstock addition pump 30. This full discharge pressure is available to overcome the downstream line resistances, to provide the energy required to slurry the catalyst, and to enter the high pressure reactor vessel. Second the flow rate of the minor portion of feedstock in line 45 is measured as part of the total feedstock by feedstock rate sensor and controller 38.

Generally 0.20% to 2.0%, typically 0.5% to 1.5%, preferably 0.5% to 0.9% of the catalyst in the reaction vessel is replaced per day. Ebullated bed hydrotreating catalyst comprises active metals on an alumina support of 60 mesh to 270 mesh. Alternatively, catalyst in the form of extrudates or spheres of ¼ inch to ⅟₃₂ inch diameter may be used. The extrudates have a length of 0.1 to 0.25 inches. In preparation for catalyst addition, a fresh dry catalyst is weighed in a measuring hopper 60 and passed via conduit 41 into addition/withdrawal drum 70. Drum 70 is sealed and pressured with hydrogen via line 75 to about 20 psi (1.36 atm) above the reactor 90 pressure. Valve 52 is opened and drum 70 filled with feedstock via line 53 to wet the catalyst in preparation for forming a slurry. Valve 52 is then closed.

Next, valve 54, ball valve 73, ball valve 97 and ball valve 92 are opened and the minor portion of feedstock flows through lines 45, 55, and 94 where it is combined with wet catalyst from drum 70 flowing under the forces of gravity and drum 70 pressure through ball valve 73 and line 74 at a rate F3 to form a catalyst/feedstock slurry. The catalyst slurry comprises 1 to 10 lb. catalyst/gallon of feedstock, typically 5 lb. catalyst/gallon of feedstock.

The catalyst/feedstock slurry flows via lines 39 and 94 into reactor 90. It is immediately apparent that the sum of the feedstock flow rate in line 94 and line 41 is F1, indicated on feedstock rate sensor and controller 38. Catalyst addition may be continuous, but in a ebullated bed process is typically intermittent, lasting for 3 minutes to 30 minutes, e.g. 1800 lb. (0.60%) of catalyst is added to a reactor containing 300,000 lb. of catalyst in 15 minutes/day. The control system provides a constant flow rate of feedstock to the reactor during intermittent catalyst addition. This in turn brings about a more constant flow rate to downstream fractionation and enhances general unit stability.

Catalyst withdrawal is accomplished with the same control system. Valves 54, 73, 92 and 97 are closed. The pressure in drum 70 is reduced to 20 psi (1.36 atm) below reactor 90 pressure. Ball valve 96 and ball valve 92 are opened and a portion of the ebullated bed reactor 90 contents is flowed via line 94 and line 95 into drum 70. Valves 92 and 96 are closed. Valve 73 and ball valve 78 are opened and the spent catalyst/oil slurry is passed via line 79 to a catalyst cooling drum 80. Vapor and excess liquid are withdrawn via line 75 to vapor recovery system (not shown). It is preferred that used catalyst be withdrawn before catalyst addition to avoid withdrawing freshly added catalyst.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. An ebullated bed process for hydrotreating a continuous distillate hydrocarbon feedstock flow in an ebullated bed of particulate catalyst at catalytic reaction conditions, characterized in:
   a. measuring an amount of addition catalyst,
   b. setting a flow rate (F1) of the total feedstock flow to the ebullated bed,
   c. withdrawing from the total feedstock flow, a minor feedstock portion at a minor portion rate (F2) and mixing addition catalyst at a flow rate (F3) with the minor feedstock portion to form an addition catalyst slurry, and passing the addition catalyst slurry to the ebullated bed at a flow rate (F2+F3), thereby maintaining a constant flow rate (F1) of the total feedstock flow to the ebullated bed.

2. The process of claim 1 wherein a ratio of flow rate (F1):flow rate (F2) ranges from 100:1 to 5:1.

3. The process of claim 1 wherein a ratio of flow rate (F1):flow rate (F2) ranges from 50:1 to 10:1.

4. The process of claim 1 wherein a ratio of flow rate (F3):flow rate (F2) ranges from 1:1 to 10:1 in units of pounds:gallon.

5. The process of claim 1 wherein step (c.) is carried out intermittently.

6. The process of claim 1 additionally comprising withdrawing a minor portion of catalyst from the ebullated bed in an admixture with the feedstock.

7. The process of claim 1 additionally comprising withdrawing 0.2% day to 2.0% day of the catalyst in the ebullated bed and admixing with the feedstock.

* * * * *

UNITED STATES PATENT AND TRADEMARK OFFICE
CERTIFICATE OF CORRECTION

PATENT NO. : 5,466,362
DATED : Nov. 14, 1995
INVENTOR(S) : Robert M. Steinberg; John C. Strickland It is certified that error appears in the above-indentified patent and that said Letters Patent is hereby corrected as shown below:

Column 6:

In Claim 7, line 2, after "0.2%", insert --/--.

In Claim 7, line 2, after "2.0%", insert --/--.

Signed and Sealed this

Twenty-seventh Day of February, 1996

Attest:

BRUCE LEHMAN

Attesting Officer

Commissioner of Patents and Trademarks